(No Model.) 2 Sheets—Sheet 2.
J. B. SKEYEN.
MECHANICAL MOTOR.
No. 433,912. Patented Aug. 5, 1890.
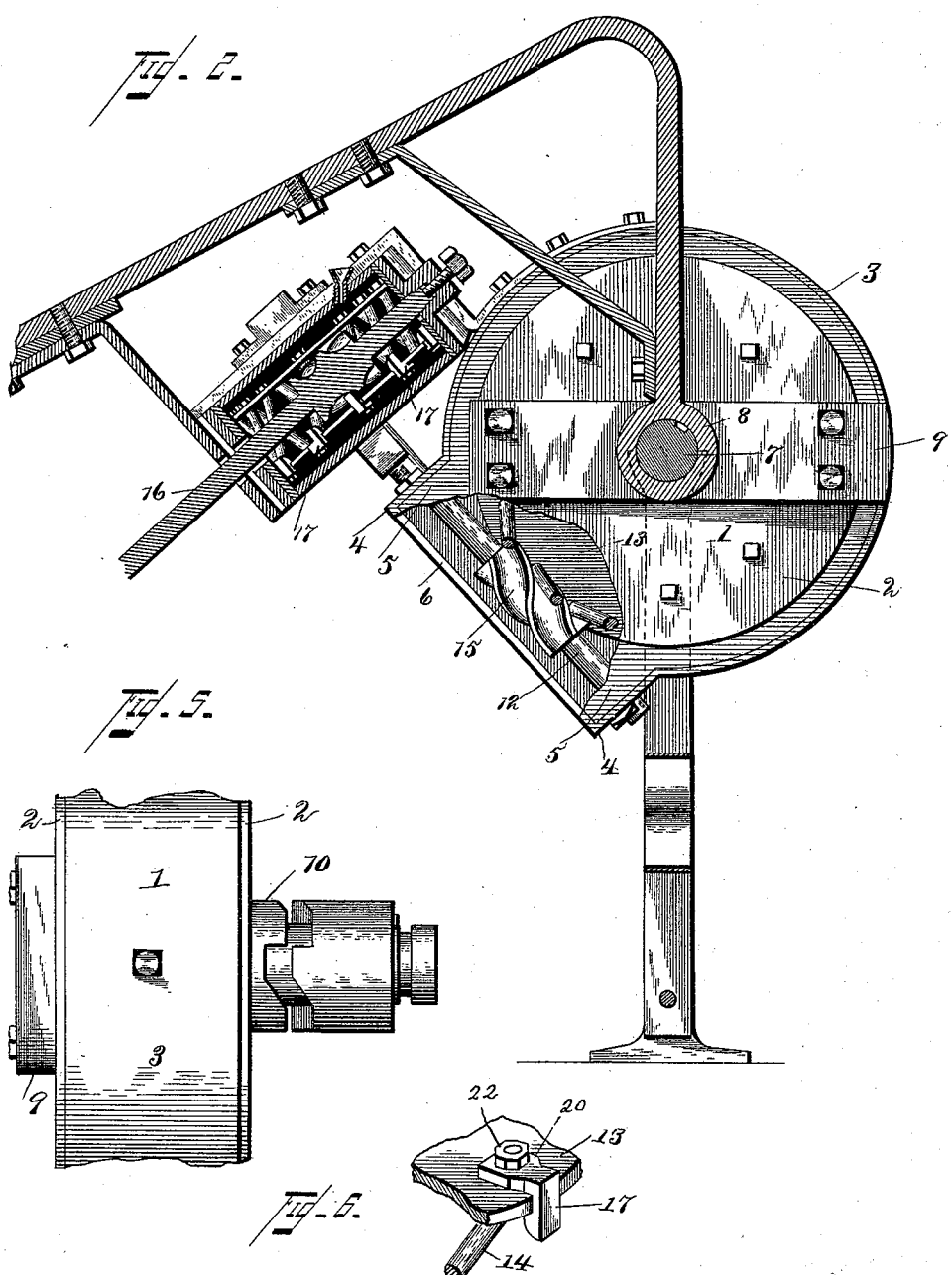
WITNESSES:
F. L. Ourand
Jo. L. Coombs
INVENTOR:
Jacob B. Skeyen,
By Janis Sagger & Co.,
Attorneys

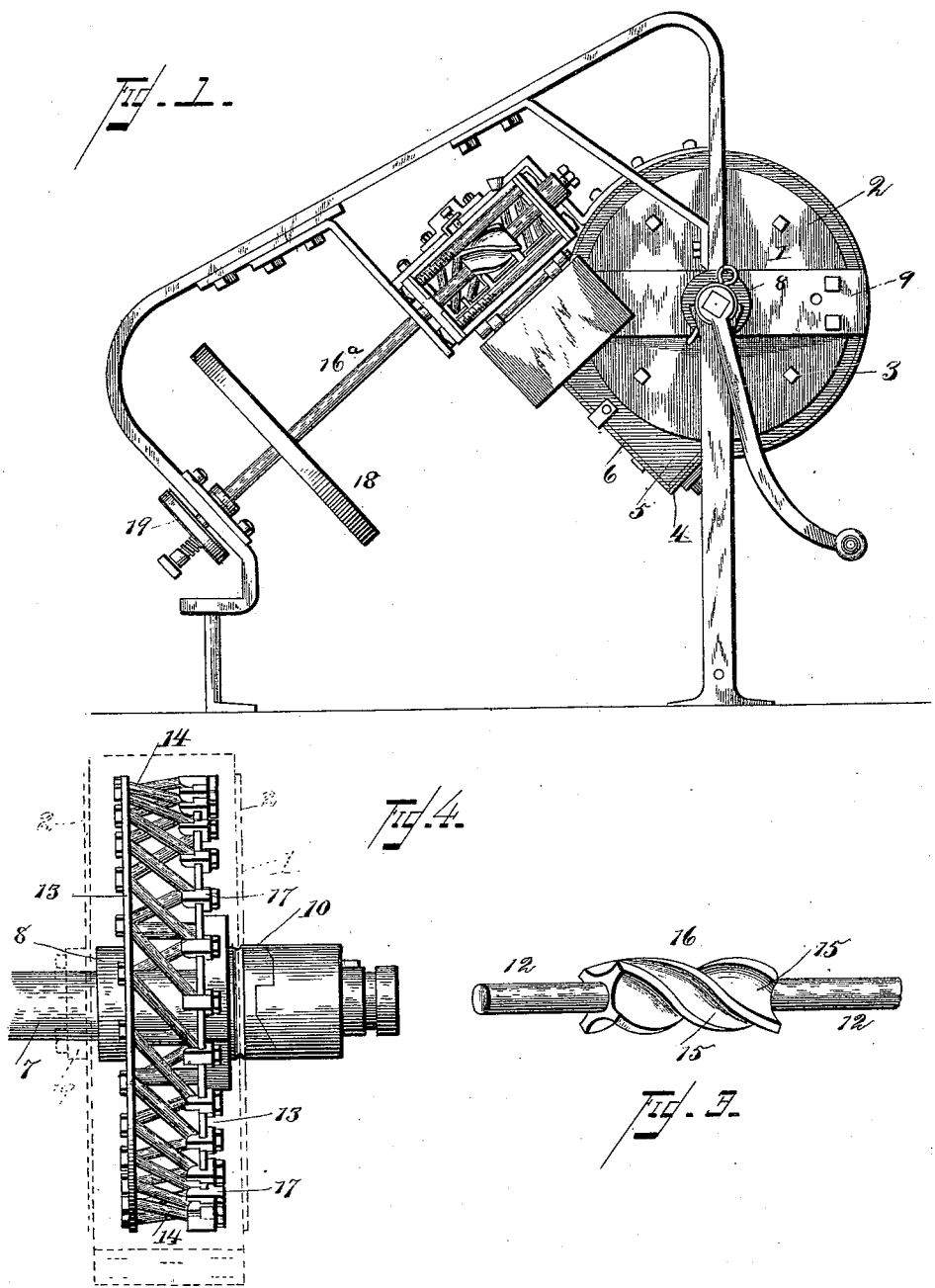

UNITED STATES PATENT OFFICE.

JACOB B. SKEYEN, OF HILLSBOROUGH, NORTH DAKOTA.

MECHANICAL MOTOR.

SPECIFICATION forming part of Letters Patent No. 433,912, dated August 5, 1890.

Application filed February 25, 1890. Serial No. 341,644. (No model.)

*To all whom it may concern:*

Be it known that I, JACOB B. SKEYEN, a citizen of the United States, and a resident of Hillsborough, in the county of Traill and State of North Dakota, have invented certain new and useful Improvements in Mechanical Motors; and I do hereby declare that the following is a full, clear, and exact description of the invention, which will enable others skilled in the art to which it appertains to make and use the same.

My invention relates to improvements in mechanical motors, and is designed to take the place of the ordinary cog-gearing in transmitting motion.

The object of my invention is to provide a simple and economical device for the above purpose, which shall be durable in use and reliable in operation.

In the ordinary cog-gearing for transmitting motion a large percentage of the power exerted is lost by reason of friction and other causes. There is also great liability of breakage of the cogs or teeth, especially where large driving-wheels and small pinions are employed, and vice versa in cases where it is desired to greatly multiply the speed or power.

My invention obviates the above and other objections, and by it a greater per cent. of the power applied is utilized than is possible with the ordinary and well-known forms of gearing.

The invention consists in the novel features of construction and new combinations of parts, hereinafter fully described, and then pointed out in the claim.

In the accompanying drawings, Figure 1 represents a side elevation of a device constructed according to my invention and arranged to drive the cutter-bar of a mower or other machine. Fig. 2 is a sectional view of part of the same. Fig. 3 is a perspective view of the pinion or screw and its shaft. Fig. 4 is an elevation of the driving-wheel. Fig. 5 is a detail view of the driving-shaft. Fig. 6 is a detail view of one of the pressure-counteracting projections.

In the said drawings, the reference-numeral 1 designates the casing or housing of the driving-wheel, consisting of the annular heads 2 2 and peripheral wall 3. This casing, or the wall 3 thereof, is cut away at 4, and the ends of said wall turned downward and the side pieces 5 secured therebetween, forming a rectangularly-shaped box, which may be provided with a hinged cover 6.

The numeral 7 designates the driving-shaft passing centrally through the heads 2 2 and through a sleeve 8, formed on a plate 9, secured to one of said heads. The driving-wheel has a central hub 10, embracing the driving-shaft, and said hub may be provided with clutch-teeth engaging with a sliding clutch on the driving-shaft, so that the latter and the driving-wheel may be thrown into and out of gear with each other, as is usual in such devices. Said hub is provided with two annular disks or rims 13. These disks near their peripheries are provided with a series of equidistant transverse oblique bars 14, which engage with the grooves 15 of a spiral 16 on the driven shaft 12, and from the rim or periphery of one of said disks or rims are projections 17, also engaging with said grooves 15. As shown, the spiral has four grooves; but it is obvious that more or less may be employed without departing from the invention.

As seen in Fig. 1, on the shaft $16^a$ is mounted a driving-wheel and casing similar to that above described, and the driven shaft $16^a$ of this device carries a fly-wheel 18 and a crank-wheel 19, to which a cutter-bar of a mower or other machine may be secured. It is obvious, however, that this latter device may be dispensed with and the machine to be operated be driven directly from shaft 12, or that the number of such devices may be increased, as desired.

The operation is as follows: Power being communicated to the driving-shaft, the driving-wheel will be caused to revolve and the oblique bars engaging with the grooves in the spiral or screw will cause the latter to be rotated and its motion transmitted to the shaft which drives the machine. At the same time the projections 17 on the wheel will also engage with the grooves of the spiral and counteract the lateral pressure on the wheel caused by the action of the said oblique bars.

By my invention a higher and more uniform speed is attained, with greater power, less friction, and less liability of breakage or injury than by the ordinary forms of gearing, thus producing a more efficient and reliable machine.

The projections 17 for counteracting the lateral pressure on the wheel may consist of a series of lugs equal in number to the oblique bars 14, and are coincident with one end thereof. As shown in Fig. 6, however, they are preferably formed of the angular plates 20, having apertures through which pass the ends of the oblique arms 14, which are secured by nuts 22. These lugs 17 are at such a distance from the ends of the oblique arms that the space therebetween is equal to the distance between two of the grooves 15, so that when one of said arms engages with one of the grooves 15 its corresponding lug engages with the next succeeding groove.

Having thus described my invention, what I claim is—

In a mechanical motor, the combination, with a driving-shaft and a driving-wheel mounted thereon, consisting of a hub, two annular disks connected to said hub, oblique peripheral bars connected with said disks, and projections on one of said disks, of a driven shaft and a spiral mounted thereon, having a number of grooves with which said bars and projections engage for the purpose of rotating said driven shaft, substantially as described.

In testimony that I claim the foregoing as my own I have hereunto affixed my signature in presence of two witnesses.

JACOB B. SKEYEN.

Witnesses:
  I. K. IVERSON,
  J. F. SELBY.